United States Patent
Poyner

(10) Patent No.: US 9,739,242 B1
(45) Date of Patent: Aug. 22, 2017

(54) GASIFICATION UNIT

(71) Applicant: Mitchell Poyner, Cedar Hill, MO (US)

(72) Inventor: Mitchell Poyner, Cedar Hill, MO (US)

( * ) Notice: Subject to any disclaimer, the term of this patent is extended or adjusted under 35 U.S.C. 154(b) by 220 days.

(21) Appl. No.: 14/728,210

(22) Filed: Jun. 2, 2015

(51) Int. Cl.
*B60H 1/00* (2006.01)
*F02M 31/18* (2006.01)

(52) U.S. Cl.
CPC .................. *F02M 31/18* (2013.01)

(58) Field of Classification Search
CPC ....................................... F02M 31/18
USPC ............................................. 165/41
See application file for complete search history.

(56) References Cited

U.S. PATENT DOCUMENTS

| | | | |
|---|---|---|---|
| 3,845,749 A | 11/1974 | Alquist | |
| 4,103,658 A * | 8/1978 | Bernecker | F02M 17/28 123/524 |
| 4,192,266 A * | 3/1980 | Duckworth | F01P 3/18 123/555 |
| 4,883,616 A * | 11/1989 | Covey, Jr. | F02M 31/081 123/545 |
| 4,926,830 A * | 5/1990 | McNelley | F02M 31/10 123/142.5 R |
| 5,118,451 A * | 6/1992 | Lambert, Sr. | F02M 31/10 123/557 |
| D381,072 S | 7/1997 | Pendleton | |
| 6,526,952 B1 | 3/2003 | Price | |
| 7,028,675 B2 * | 4/2006 | Bushnell | F02D 41/003 123/546 |
| 8,028,681 B1 | 10/2011 | Pifer | |
| 2007/0022976 A1 * | 2/2007 | Lerner | F02B 51/00 123/3 |
| 2008/0022979 A1 | 1/2008 | Ward | |
| 2008/0257315 A1 * | 10/2008 | Thomas | F02M 31/18 123/548 |

FOREIGN PATENT DOCUMENTS

CN 2229534 Y 6/1996

* cited by examiner

*Primary Examiner* — Justin Jonaitis

(57) ABSTRACT

The gasification unit includes a heat exchanger with a first circuit and a second circuit. The first circuit is in-line connection with an engine coolant; whereas the second circuit is in-line connection with an engine fuel line. The heat exchanger is used to capture heat from the first circuit via the engine coolant, and transfer said heat to the second circuit thereby heating up the fuel. The gasification unit is used to heat the fuel post fuel pump, but prior to being injected into the cylinder of an internal combustion engine. The heating of the fuel via the gasification unit improves the overall fuel economy of the internal combustion engine.

7 Claims, 5 Drawing Sheets

GASIFICATION UNIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of internal combustion engines, more specifically, a device that is adapted to work with an internal combustion engine in order to utilize heat from the coolant lines in order to heat up gasoline prior to injection into the cylinders for combustion.

SUMMARY OF INVENTION

The gasification unit includes a heat exchanger with a first circuit and a second circuit. The first circuit is in-line connection with an engine coolant; whereas the second circuit is in-line connection with an engine fuel line. The heat exchanger is used to capture heat from the first circuit via the engine coolant, and transfer said heat to the second circuit thereby heating up the fuel. The gasification unit is used to heat the fuel post fuel pump, but prior to being injected into the cylinder of an internal combustion engine. The heating of the fuel via the gasification unit improves the overall fuel economy of the internal combustion engine. The first circuit as well as the second circuit includes a temperature gauge that is able to provide information as it pertains to the temperature of the coolant entering the gasification unit as well as the temperature of the fuel leaving the gasification unit.

These together with additional objects, features and advantages of the gasification unit will be readily apparent to those of ordinary skill in the art upon reading the following detailed description of the presently preferred, but nonetheless illustrative, embodiments when taken in conjunction with the accompanying drawings.

In this respect, before explaining the current embodiments of the gasification unit in detail, it is to be understood that the gasification unit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the gasification unit.

It is therefore important that the claims be regarded as including such equivalent construction insofar as they do not depart from the spirit and scope of the gasification unit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
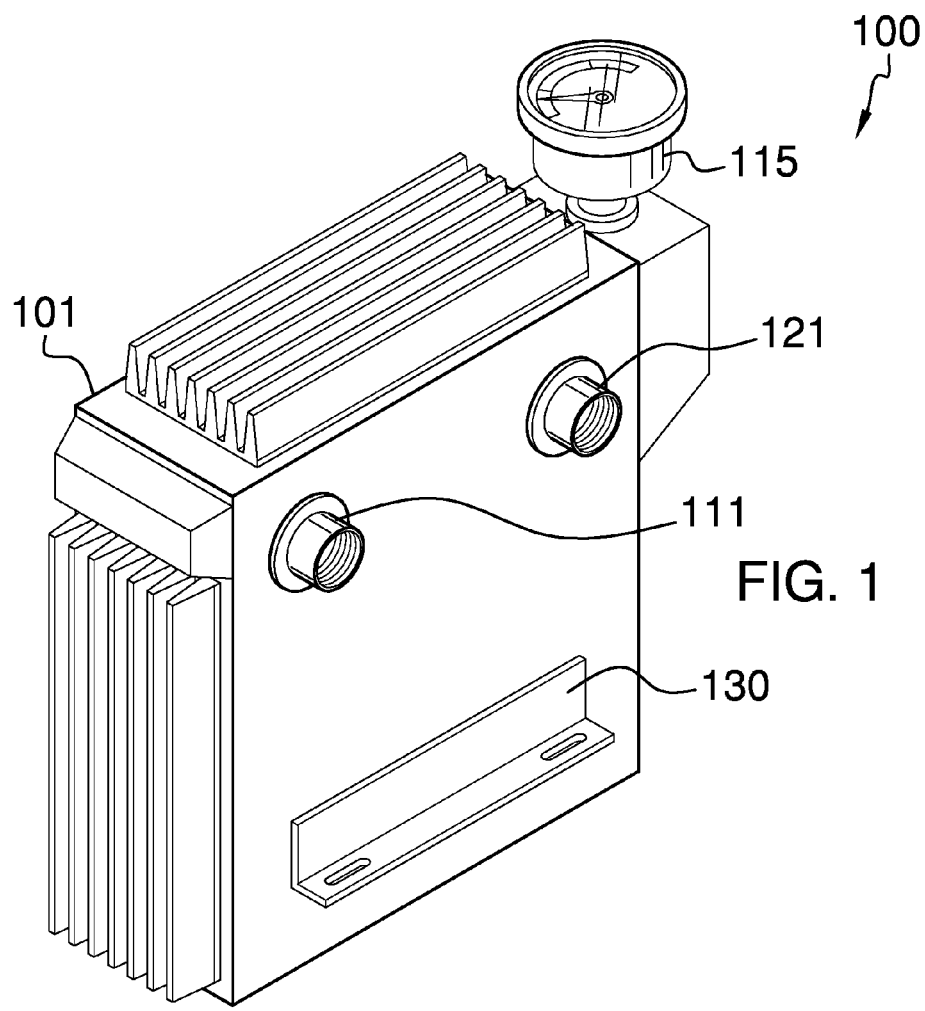
FIG. 1 is a perspective view of an embodiment of the disclosure.
Figure 2:
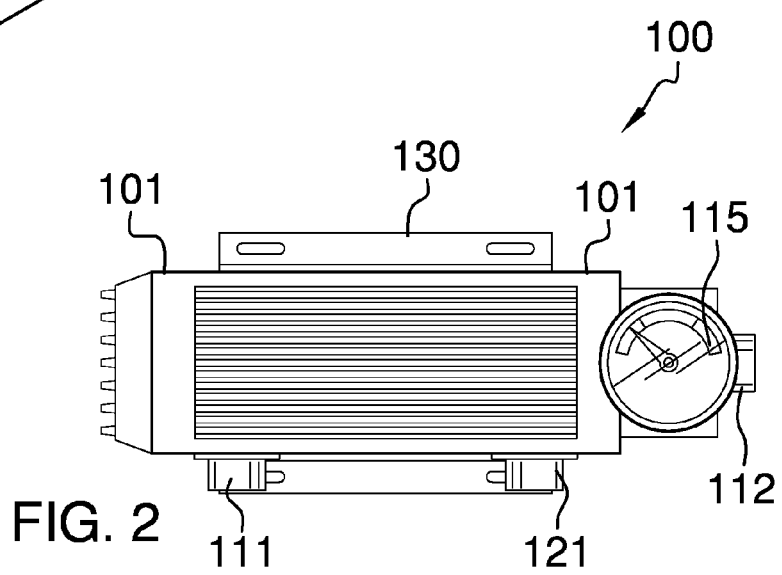
FIG. 2 is a top view of an embodiment of the disclosure.
Figure 3:
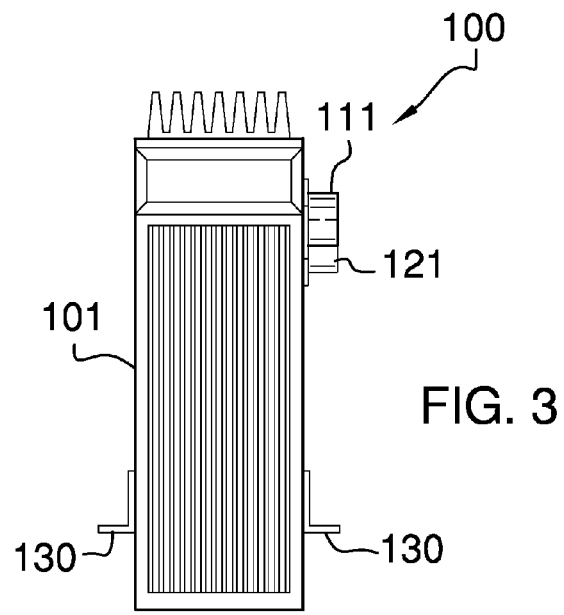
FIG. 3 is a side view of an embodiment of the disclosure.
Figure 4:
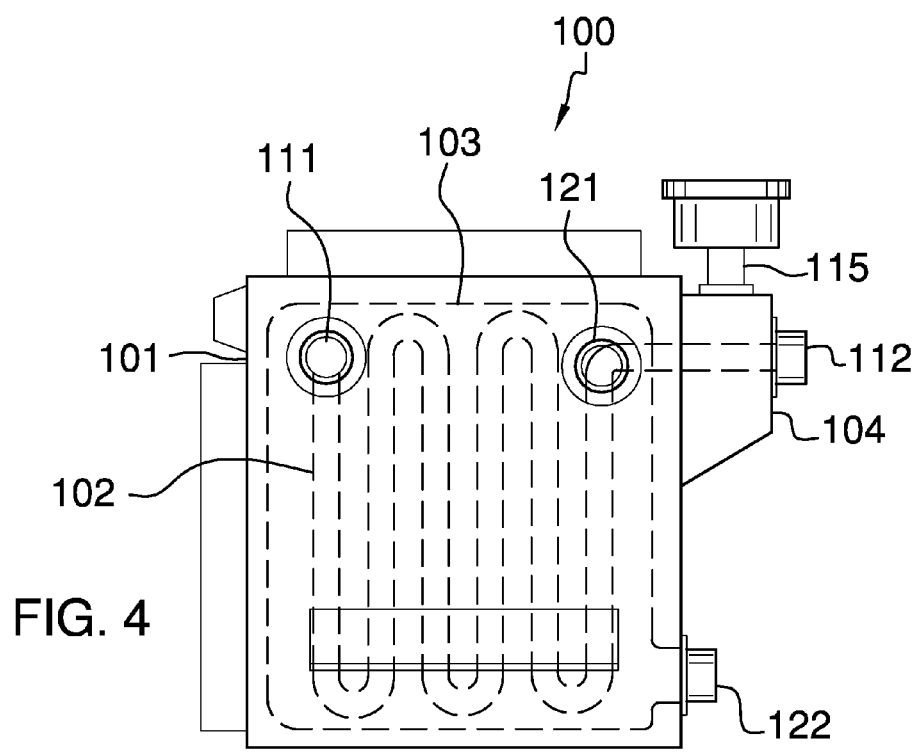
FIG. 4 is a front view of an embodiment of the disclosure.
Figure 5:
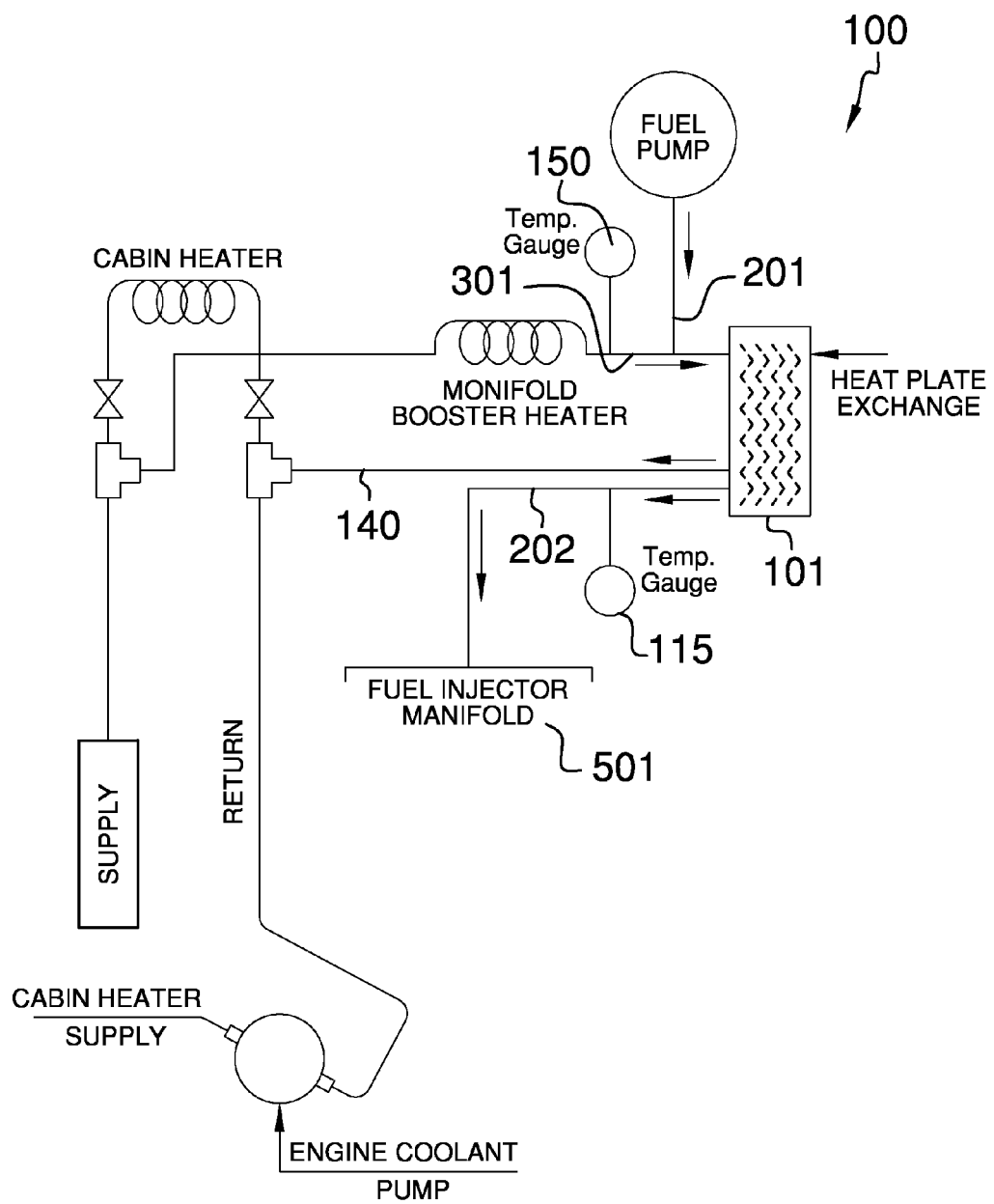
FIG. 5 is a block view of an embodiment of the disclosure.
Figure 6:
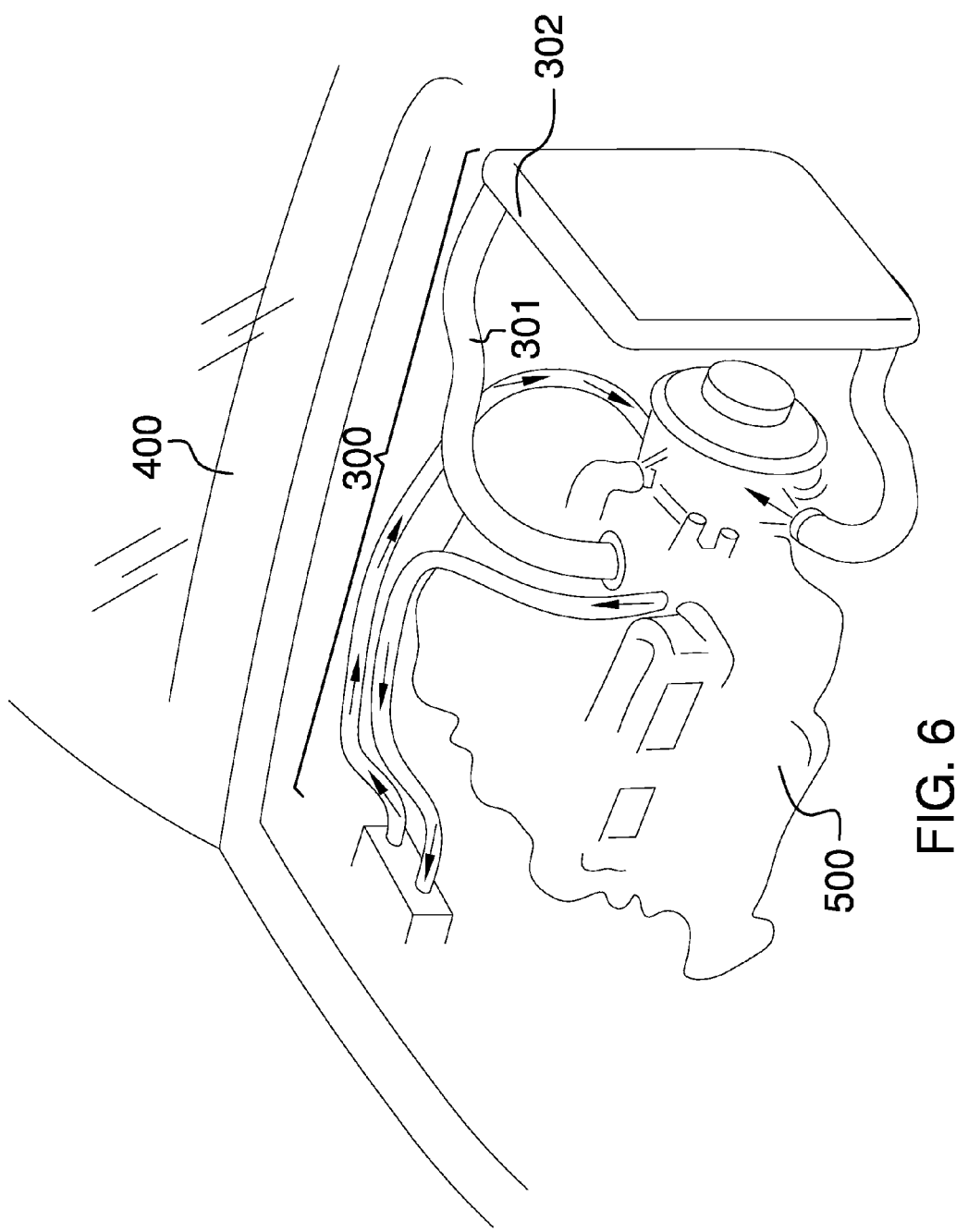
FIG. 6 is a view of an engine compartment of a vehicle.
Figure 7:
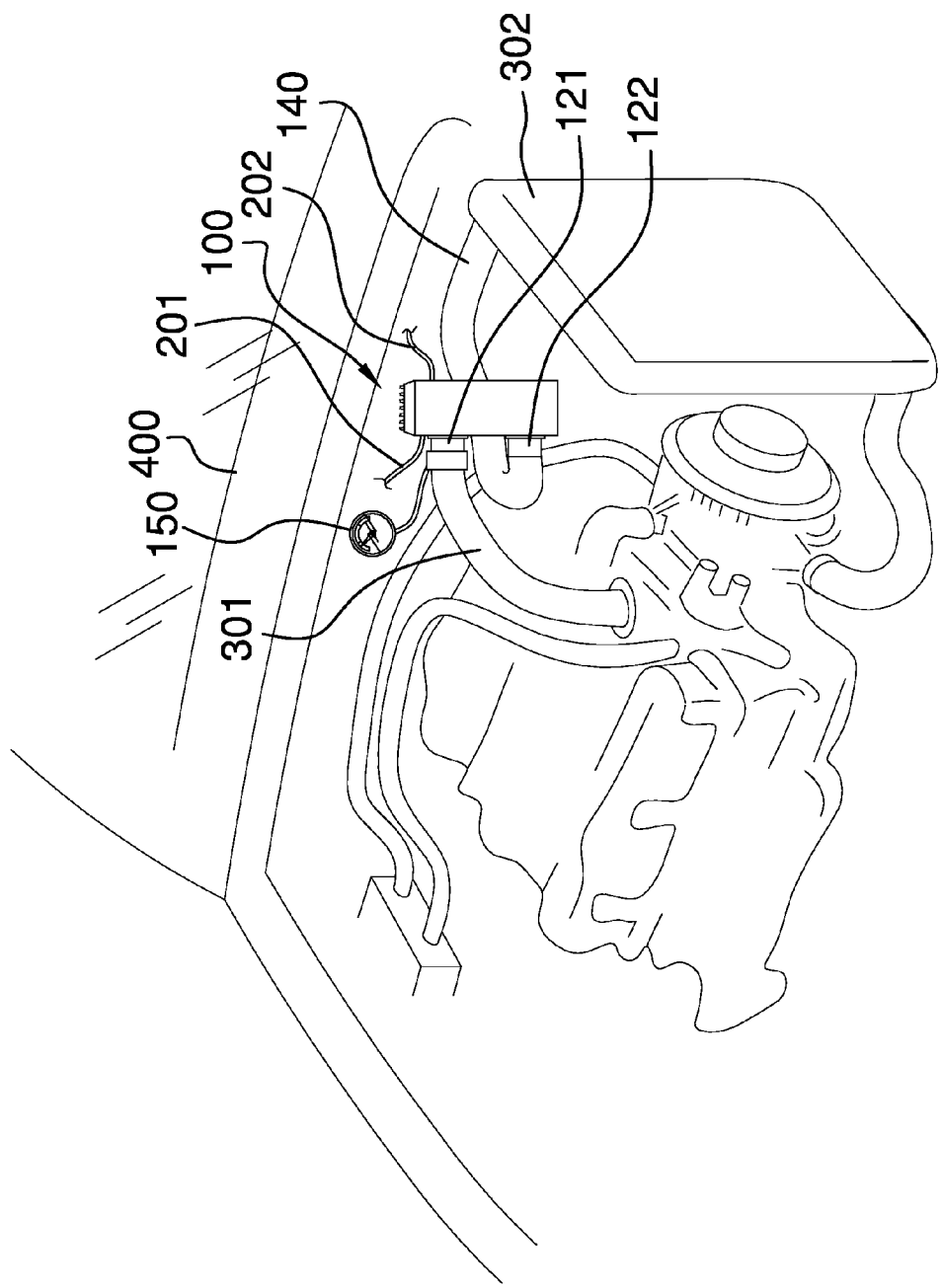
FIG. 7 is a view of an embodiment of the disclosure installed in the engine compartment of said vehicle.

Detailed reference will now be made to a first potential embodiment of the disclosure, which is illustrated in FIGS. 1 through 7. The gasification unit 100 (hereinafter invention) comprises a heat exchanger housing 101 that is of hollowed construction, and includes a first circuit 102 therein. A second circuit 103 is formed inside of the heat exchanger housing 101. The second circuit 103 occupies any remaining space aside of the first circuit 202 within the heat exchanger housing 101.

The first circuit 102 is adapted to connect in-line with a gas line 200 of a motor vehicle 400. The first circuit 102 is further defined with a first inlet 111 and a first outlet 112. The first inlet 111 and the first outlet 112 are provided on an exterior surface 104 of the heat exchanger housing 101. The first inlet 111 is adapted to be connected with a first fuel line 201; whereas the first outlet 112 is adapted to be connected with a second fuel line 202. The first outlet 112 is also connected to a first temperature gauge 115.

The second circuit 103 is adapted to connect in-line with a coolant system 300 of said motor vehicle. The second circuit 103 includes a second inlet 121 and a second outlet 122. The second inlet 121 is in fluid connection with the second outlet 122. Moreover, the second circuit 103 encompasses the first circuit 102. The second circuit 103 is adapted to be filled with coolant that has a temperature, which enables heat to be transferred to the first circuit 102. The first circuit 102 being in fluid connection with the fuel line 200 of the vehicle 400 in order to heat up fuel prior to be introduced into an engine 500 associated with the vehicle 400 as well as the coolant system 300.

The heat exchanger housing 101 is adapted to be secured inside of an engine compartment of the vehicle 400 via mounting brackets 300. The second circuit 103 utilizes the second inlet 121 and the second outlet 122 to connect in-line with the coolant system 300. Moreover, the coolant system 300 is further defined with a coolant over exhaust line 301 that extends from the engine 500 over to a radiator 302. The second inlet 121 connects directly to the coolant over exhaust line 301. A third coolant line 140 is used to connect the second outlet 122 to the radiator 302.

A second temperature gauge 150 is needed at the connection where the second inlet 121 connects with the coolant over exhaust line 301. The second temperature gauge 150 monitors the temperature of coolant entering the second circuit 103; whereas the first temperature gauge 115 monitors the temperature of fuel exiting the first circuit 102. The invention 100 is designed to heat up fuel prior to introduction into a fuel injector manifold 501 of the engine 500. Moreover, hotter fuel increases the miles per gallon of the vehicle 400. The hotter fuel is introduced prior to being injected into the cylinder of the engine 500, which is not depicted, but is obvious in the field.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A gasification unit adapted for use with an internal combustion engine comprising:
    a heat exchanger that is installed in-line with a fuel line as well as installed in-line with a coolant system of a vehicle;
    wherein the coolant system of the vehicle is able to provide heat that is transferred via the heat exchanger to the fuel line in order to heat up the fuel thereby improving an overall miles per gallon rating of said vehicle;
    wherein the heat exchanger is further defined with a heat exchanger housing that is of hollowed construction, and includes a first circuit as well as a second circuit;
    wherein the second circuit is formed inside of the heat exchanger housing; wherein the second circuit occupies any remaining space aside from the first circuit within the heat exchanger housing;
    wherein the first circuit is adapted to connect in-line with the fuel line of said vehicle;
    wherein the first circuit is further defined with a first inlet and a first outlet;
    wherein the first inlet and the first outlet are provided on an exterior surface of the heat exchanger housing;
    wherein the first inlet is adapted to be connected with a first fuel line;
    whereas the first outlet is adapted to be connected with a second fuel line;
    wherein the first outlet is also connected to a first temperature gauge;
    wherein the second circuit is adapted to connect in-line with the coolant system of said motor vehicle;
    wherein the second circuit includes a second inlet and a second outlet;
    wherein the second inlet and the second outlet are both provided on the exterior of the heat exchanger housing;
    wherein the second inlet is in fluid connection with the second outlet;
    wherein the second circuit is adapted to be filled with coolant that has a temperature, which enables heat to be transferred to the first circuit;
    wherein the first circuit being in fluid connection with the fuel line of the vehicle in order to heat up fuel prior to being introduced into a fuel injector manifold of the engine associated with the vehicle as well as the coolant system;
    wherein the first circuit extends in a serpentine configuration within the heat exchanger housing.

2. The gasification unit according to claim 1 wherein the heat exchanger housing is adapted to be secured inside of an engine compartment of the vehicle via mounting brackets.

3. The gasification unit according to claim 2 wherein the second circuit utilizes the second inlet and the second outlet to connect in-line with the coolant system.

4. The gasification unit according to claim 3 wherein the coolant system is further defined with a coolant over exhaust line that extends from the engine over to a radiator of the vehicle; wherein the second inlet connects directly to the coolant over exhaust line.

5. The gasification unit according to claim 4 wherein a third coolant line is used to connect the second outlet to the radiator of the vehicle.

6. The gasification unit according to claim 5 wherein a second temperature gauge is needed at the connection where the second inlet connects with the coolant over exhaust line.

7. The gasification unit according to claim 6 wherein the second temperature gauge monitors the temperature of coolant entering the second circuit; whereas the first temperature gauge monitors the temperature of fuel exiting the first circuit.

* * * * *